Figure 3:
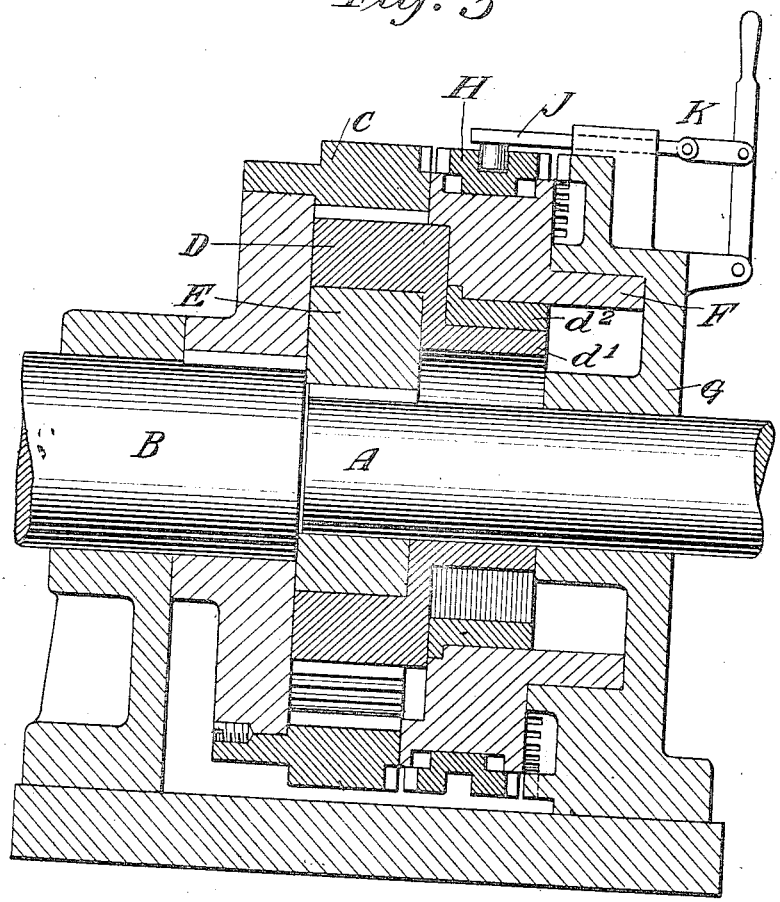

E. M. BENTLEY.
GEARING.
APPLICATION FILED MAR. 16, 1917.
1,287,837.
Patented Dec. 17, 1918.
2 SHEETS—SHEET 1.
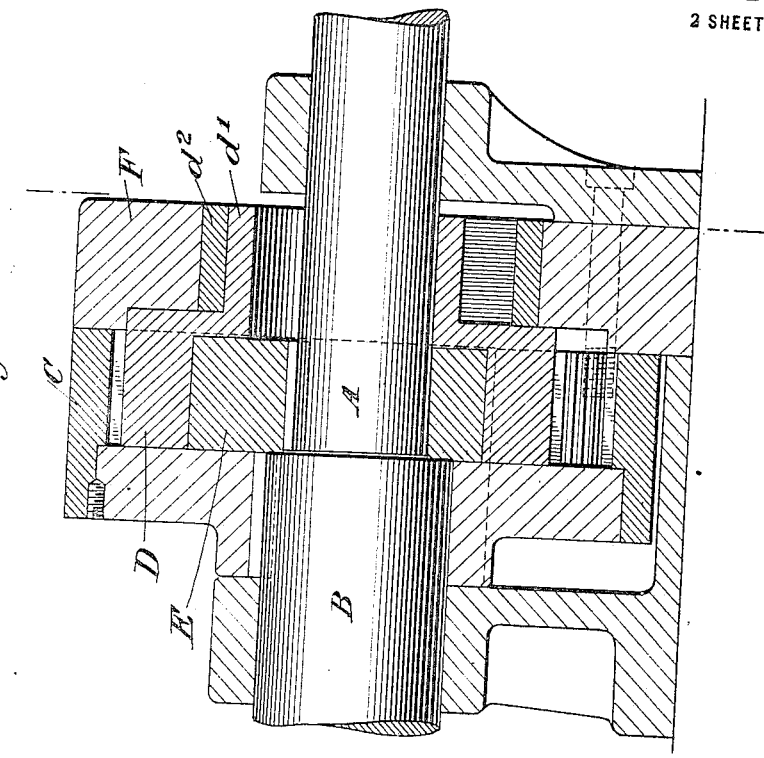
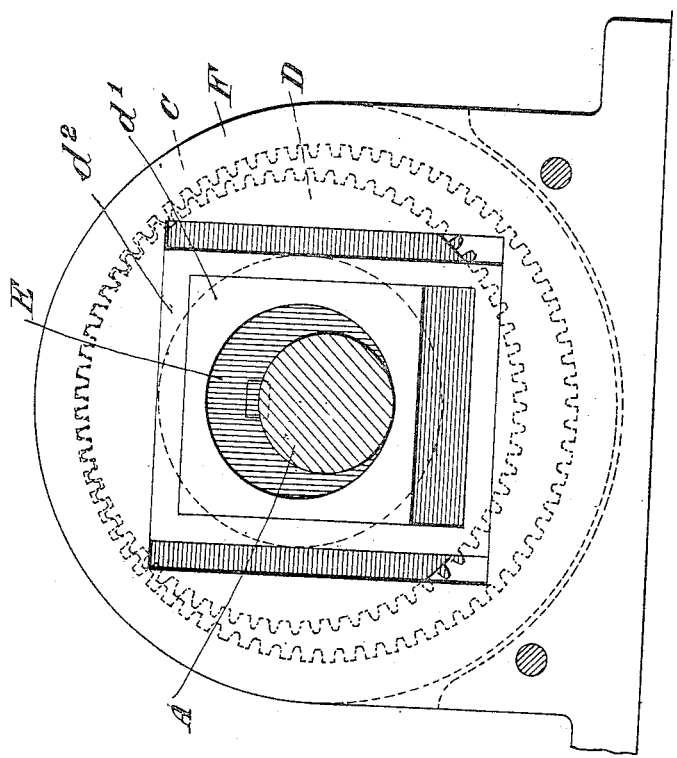
Inventor
Edward M. Bentley

UNITED STATES PATENT OFFICE.

EDWARD M. BENTLEY, OF LAWRENCE, NEW YORK.

GEARING.

1,287,837.

Specification of Letters Patent. Patented Dec. 17, 1918.

Application filed March 16, 1917. Serial No. 155,229.

*To all whom it may concern:*

Be it known that I, EDWARD M. BENTLEY, a citizen of the United States, residing at Lawrence, county of Nassau, and State of New York, have invented certain new and useful Improvements in Gearing, the following being a full, clear, and exact disclosure of the one form of my invention which I at present deem preferable.

For a detailed description of the present form of my invention, reference may be had to the following specification and to the accompanying drawings, which illustrate my invention, wherein—

Figure 1 shows a front elevation,

Fig. 2 a vertical section and

Fig. 3 a modification of my improved gearing.

My invention relates to a gearing which is particularly designed for connecting end-to-end shafts with a large gearing ratio, but may be used in any suitable situation and with any suitable gear ratio.

Referring to Figs. 1 and 2 of the drawings, A and B are the two shafts, placed end to end and mounted in separate bearings. On shaft B is an internally toothed gear wheel C and meshing therewith is an externally toothed gear wheel D mounted on a crank or eccentric E, which is keyed to and driven by shaft A,—assuming shaft A to be the driving member.

The crank or eccentric E and wheel D carried thereby are preferably counterbalanced by being made heavier on the short-radius side and lighter on the long-radius side.

On the front face of wheel D is a rectangular projection $d^1$ and outside of $d^1$ is a rectangular frame $d^2$ contained in a rectangular opening in a stationary disk F, which constitutes a bearing member for wheel D controlling its bodily relation to its shaft A. By this device, which I term a diameter guide, the wheel D can slide both vertically and horizontally but is prevented from rotating on its own axis, although it can revolve bodily around the common axis of the two shafts, its several diameters remaining unchanged in direction. It is furnished, in the illustrative example shown in the drawing, with 68 teeth, while the wheel C meshing therewith has 74 teeth. Each revolution of D, produced by one rotation of shaft A, will manifestly cause C to rotate a distance determined by the difference between the number of teeth in the two wheels—viz. six teeth, and it will take eleven and one-third turns of shaft A to produce one turn of shaft B.

It is also obvious that if the disk F were free to rotate, it would allow the eccentric gear wheel D to rotate as well as to revolve, with the result that the two shafts would be free of each other. On the other hand, if disk F were clutched to wheel C, it would establish a direct driving connection between the two shafts.

In Fig. 3 I have shown means by which the disk F may be free to rotate, the two shafts being then disconnected, or clutched to the wheel C, the two shafts being then connected for direct drive, or clutched to the standard of the machine, the two shafts then having the gearing ratio heretofore described. For that purpose disk F is journaled in the standard G and provided on its outer periphery with a clutch ring H splined to rotate with but slide axially on the disk. Ring H is shown with clutch teeth on each face, the teeth on one side being adapted to engage corresponding teeth on the front face of wheel C, or similar teeth on standard G. The clutch ring can be shifted by means of a handle K and roller-rod J. In the position shown in Fig. 3 the clutch teeth will not engage either the wheel C or the standard and the two shafts will be free; when the teeth engage standard G the two shafts will drive through the gearing; when they engage wheel C the two shafts will drive directly. A friction form of clutch may be used instead of the toothed form, and the wheels D and C may have any desired number of teeth, provided, of course, the radius of eccentricity of wheel D is of the proper length to bring it into mesh with C. Any other desired means for preventing rotation of D may be employed and such rotation may be wholly prevented or controlled by a brake or disk F.

What I claim as new and desire to secure by Letters Patent is:

1. A gearing comprising two shafts, an eccentric gear on the first shaft, a concentric gear on the second shaft meshing therewith, a bearing member for said eccentric gear and a rotary shiftable member for connecting the said bearing member with the second shaft, or with a stationary part, or allowing it to run free.

2. A gearing comprising two shafts, an eccentric gear on the first shaft, a concentric gear on the second shaft meshing therewith, a disk provided with a bearing for said eccentric gear and a shiftable member on said disk for connecting it with the second shaft or with a stationary part or allowing it to run free.

3. A gearing comprising two shafts, an eccentric gear on the first shaft, a concentric gear on the second shaft meshing therewith, a disk provided with a bearing for the said eccentric gear and made heavier on one side to counterbalance the weight of the gear on the opposite side and means for connecting said disk with the second shaft or with a stationary part or allowing it to run free.

In witness whereof I have hereunto set my hand this 12th day of March, 1917.

EDWARD M. BENTLEY.